(12) United States Patent
Nakaoka

(10) Patent No.: US 11,514,556 B2
(45) Date of Patent: Nov. 29, 2022

(54) IMAGE PROCESSING APPARATUS, IMAGE PROCESSING METHOD, AND IMAGE PICKUP APPARATUS FOR DISPLAYING IMAGE FOR USE IN FOCUSING OPERATION

(71) Applicant: CANON KABUSHIKI KAISHA, Tokyo (JP)

(72) Inventor: Hiroshi Nakaoka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 17/317,689

(22) Filed: May 11, 2021

(65) Prior Publication Data

US 2021/0358090 A1   Nov. 18, 2021

(30) Foreign Application Priority Data

May 15, 2020   (JP) .............................. JP2020-085946

(51) Int. Cl.
*G06K 9/00* (2022.01)
*G06T 5/00* (2006.01)
*G06T 5/20* (2006.01)
*H04N 5/232* (2006.01)
*G06T 7/00* (2017.01)

(52) U.S. Cl.
CPC ................ *G06T 5/002* (2013.01); *G06T 5/20* (2013.01); *G06T 7/0002* (2013.01); *H04N 5/23212* (2013.01); *G06T 2207/20024* (2013.01)

(58) Field of Classification Search
CPC ......... G06T 5/002; G06T 5/20; G06T 7/0002; G06T 2207/20024; G06T 2207/30168; H04N 5/23212; H04N 5/232935; H04N 5/772; H04N 5/232122; H04N 5/232127; H04N 5/36961
USPC ...................................................... 382/100
See application file for complete search history.

(56) References Cited

U.S. PATENT DOCUMENTS

2014/0028806 A1* 1/2014 Endo .................... H04N 13/286
                                                                 348/49

FOREIGN PATENT DOCUMENTS

JP     2010-145693 A     7/2010

* cited by examiner

*Primary Examiner* — Stephen P Coleman
(74) *Attorney, Agent, or Firm* — Canon U.S.A., Inc. IP Division

(57) ABSTRACT

An apparatus which is capable of displaying an image for a user to easily recognize the brightness and colors of an area of interest in the image and easily determine whether a subject is in focus. The amount of image shift between parallax image signals is calculated. The amount of blur in an area where an image shift occurs in the parallax image signals is determined based on the amount of image shift. A blurring process is performed on at least one of the parallax image signals based on the amount of blur. An image based on the display image signal generated based on the resulting parallax image signal is displayed on a display. The determined amount of blur is greater than the amount of blur shown by a subject image defocused by the amount of defocus converted from the amount of image shift.

19 Claims, 12 Drawing Sheets

IMAGE PROCESSING APPARATUS, IMAGE PROCESSING METHOD, AND IMAGE PICKUP APPARATUS FOR DISPLAYING IMAGE FOR USE IN FOCUSING OPERATION

BACKGROUND OF THE DISCLOSURE

Field of the Disclosure

The aspect of the embodiments relates to an image processing apparatus, an image processing method, and an image pickup apparatus, and in particular to a technique for clearly indicating to a user whether or not an area of interest in an image is in focus.

Description of the Related Art

A technique for displaying an in-focus area and an out-of-focus area in an image in a distinguishable manner so as to clearly indicate to a user where the in-focus area is in the image is known. For example, Japanese Laid-Open Patent Publication (Kokai) No. 2010-145693 discloses an image processing apparatus which performs a numerical analysis of an image signal to extract edge components, determines an in-focus area based on the edge components, and indicates enhanced edges in the in-focus area. Japanese Laid-Open Patent Publication (Kokai) No. 2010-145693 further discloses a display method of increasing brightness in an in-focus area, a display method of decreasing brightness in an out-of-focus area, and a display method of decreasing color saturation in an out-of-focus area. According to these disclosed techniques, a user can visually recognize an in-focus area and an out-of-focus area with ease.

However, emphasizing an in-focus area or deemphasizing an out-of-focus area as with the technique disclosed in Japanese Laid-Open Patent Publication (Kokai) No. 2010-145693, may cause a problem of difficulty to recognize the brightness and coloration of a main subject and its background or an image as a whole. Moreover, when a user performs a focusing operation (focus adjustment) while viewing a display device having a relatively small display area, like a liquid crystal panel or an electronic viewfinder of an image pickup apparatus, it may cause a problem of difficulty to perceive a slight difference in blurring between an in-focus area and its vicinity.

SUMMARY OF THE DISCLOSURE

According to an aspect of the embodiments, an apparatus includes at least one processor and a memory coupled to the at least one processor, the memory having instructions that, when executed by the at least processor, perform to: obtain a plurality of parallax image signals representing a plurality of parallax images; calculate an amount of image shift between the plurality of parallax image signals; and determine an amount of blur in an area in which an image shift occurs in the plurality of parallax image signals, based on the amount of image shift. The instructions further perform to: carry out a blurring process on at least one of the plurality of parallax image signals, based on the amount of blur; generate a display image signal based on the at least one of the plurality of parallax image signals subjected to the blurring process; and display an image based on the display image signal on a display. The instructions further perform to determine the amount of blur such that the amount of blur determined based on the amount of image shift is greater than an amount of blur shown by a subject image defocused by an amount of defocus converted from the amount of image shift.

According to another aspect of the embodiments, an apparatus includes an optical system; a sensor that outputs a plurality of parallax image signals representing a plurality of parallax images, by converting an image of light entering the optical system into image signals; and at least one processor and a memory coupled to the at least one processor, the memory having instructions that, when executed by the at least processor, perform to: obtain the plurality of parallax image signals output from the sensor; calculate an amount of image shift between the plurality of parallax image signals; determine an amount of blur in an area where an image shift occurs in the plurality of parallax image signals, based on the amount of image shift. The instructions further perform to: carry out a blurring process on at least one of the plurality of parallax image signals, based on the amount of blur; generate a display image signal based on the at least one of the plurality of parallax image signals subjected to the blurring process; and display an image based on the display image signal on a display. The instructions further perform to determine the amount of blur such that the amount of blur determined based on the amount of image shift is greater than an amount of blur shown by a subject image defocused by an amount of defocus converted from to the amount of image shift.

According to yet another aspect of the embodiments, a method includes: obtaining a plurality of parallax image signals representing a plurality of parallax images; calculating an amount of image shift between the obtained plurality of parallax image signals; determining an amount of blur in an area in which an image shift occurs in the plurality of parallax image signals, based on the calculated amount of image shift; carrying out a blurring process on at least one of the plurality of parallax image signals, based on the determined amount of blur; generating a display image signal based on the at least one of the plurality of parallax image signals subjected to the blurring process, and displaying an image based on the display image signal on a display. The amount of blur is determined such that the amount of blur determined based on the amount of image shift is greater than an amount of blur shown by a subject mage defocused by an amount of defocus converted from the amount of image shift.

Further features of the disclosure will become apparent from the following description of exemplary embodiments (with reference to the attached drawings).

DESCRIPTION OF THE EMBODIMENTS

Embodiments of the disclosure will now be described in detail with reference to the drawings by taking up image pickup apparatuses each equipped with an image processing apparatus according to the disclosure. Examples of the image pickup apparatuses include digital cameras (such as compact type cameras, mirrorless type cameras, and single-lens reflex type cameras), digital video cameras, communication apparatuses each equipped with an image pickup function (such as smartphones), electronic apparatuses (such as tablet PCs).

Figure 1:
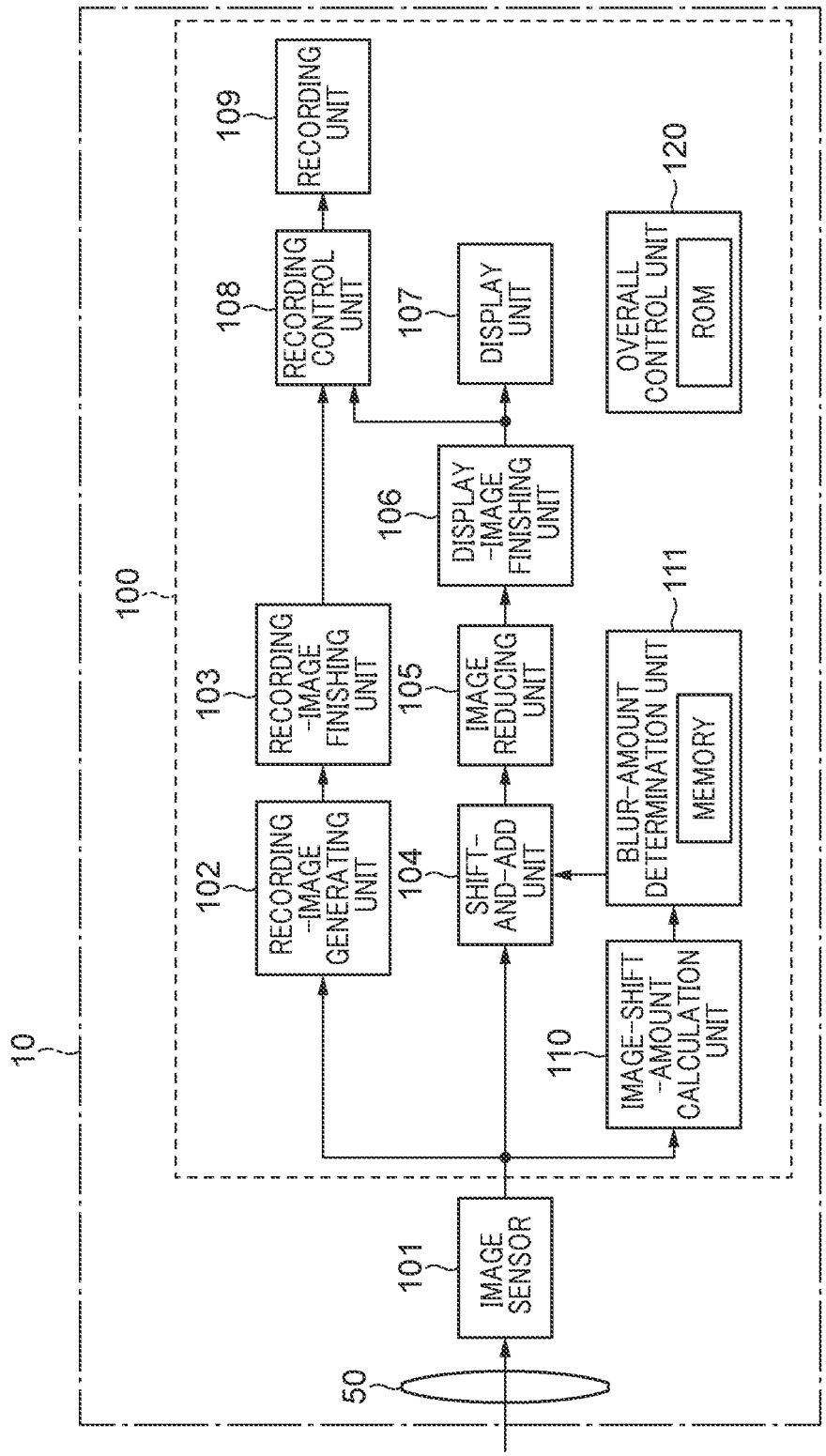
FIG. 1 is a block diagram of an image processing apparatus according to a first embodiment.

FIG. 1 is a block diagram of an image pickup apparatus 10 according to a first embodiment of the disclosure. The image pickup apparatus 10 includes an image pickup optical system 50, an image sensor 101, and an image processing apparatus 100. The image processing apparatus 100 is configured to determine the amount of blur based on the amount of image shift, generate a signal for a display image (hereafter referred to as a "display image signal") based on the determined amount of blur, and display the display image on a display.

Light from a subject passes through the image pickup optical system 50 and forms a subject image (an optical image) on an image pickup surface of the image sensor 101. The image sensor 101 is configured to convert an optical image formed on the image pickup surface into an electric signal through photoelectric conversion and output the electric signal as an image signal to the image processing apparatus 100. The image sensor 101 includes a plurality of photoelectric conversion elements each configured to capture and receive light fluxes differing in the direction of incidence. The image sensor 101 is also configured to output parallax image signals corresponding to respective light fluxes differing in the direction of incidence as will be described later. It should be noted that the image sensor 101 is also configured to bring together the image signals given though the plurality of photoelectric conversion elements receiving light fluxes and converting them into electric signals, and then collectively output them as one image signal.

The image processing apparatus 100 is configured to obtain an image signal from the image sensor 101. The image processing apparatus 100 includes a recording-image generating unit 102, a recording-image finishing unit 103, a shift-and-add unit 104, an image reducing unit 105, a display-image finishing unit 106, a display unit 107, a recording control unit 108, a recording unit 109, an image-shift-amount calculation unit 110, and a blur-amount determination unit 111.

The recording-image generating unit 102 is configured to add up a plurality of parallax image signals output from the image sensor 101 with respect to corresponding coordinates or positions, and output an image signal. The recording-image finishing unit 103 is configured to perform, on the image signal obtained from the recording-image generating unit 102, a predetermined finishing process in which it performs processing like white balance process, demosaicing and/or color conversion, and then converts the resulting signal into a YUV signal. The recording-image finishing unit 103 outputs the image signal subjected to the finishing process (hereafter referred to as a "recording image signal") to the recording control unit 108.

The shift-and-add unit 104 is configured to carry out a blurring process in which it carries out a shift-and-add process on the parallax image signals output from the image sensor 101 by using the amount of blur (the amount of shift "s" which will be described alter) output from the blur-amount determination unit 111, and output a blurred image signal to the image reducing unit 105. The image reducing unit 105 is configured to carry out a reducing process on the image signal obtained from the shift-and-add unit 104. It should be noted that the reducing process carried out by the image reducing unit 105 is a process in which the number of horizontal pixels and the number of vertical pixels are reduced at a predetermined rate, and the number of pixels in an image signal output from the image reducing unit 105 is less than the number of pixels in an image signal input to the image reducing unit 105.

The display-image finishing unit 106 is configured to perform, on the image signal obtained from the image reducing unit 105, a predetermined finishing process in which it performs processing like white balance process, demosaicing, and/or color conversion, and then converts the resulting signal into a YUV signal. The display-image finishing unit 106 outputs the image signal subjected to the finishing process as a display image signal to the display unit 107 and the recording control unit 108. The display unit 107 includes a display device like a liquid crystal panel or an organic EL panel on which the display image signal obtained from the display-image finishing unit 106 is displayed. It should be noted that in the following description, displaying an image (image for display) on the display device by using the display image signal is expressed as displaying the display image signal for the sake of convenience.

The recording control unit 108 is configured to reconstruct (combine) the recording image signal output from the recording-image finishing unit 103 and the display image signal output from the display-image finishing unit 106 into a single piece of recording data according to a predetermined format. The recording unit 109 is a recording device typified by a recording medium that holds recoding data generated by the recording control unit 108.

The image-shift-amount calculation unit 110 is configured to use the parallax image signals output from the image sensor 101 to calculate the amount of image signal shift (amount of image shift) between the parallax image signals. The blur-amount determination unit 111 is configured to determine the amount of blur to be used for generating the display image signal, based on the amount of image shift obtained from the image-shift-amount calculation unit 110. An overall control unit 120 is configured to control the overall operation of the image pickup apparatus 10 by controlling operations of the components constituting the image pickup apparatus 10. The overall control unit 120 is, for example, a microprocessor (MPU).

Figure 2:
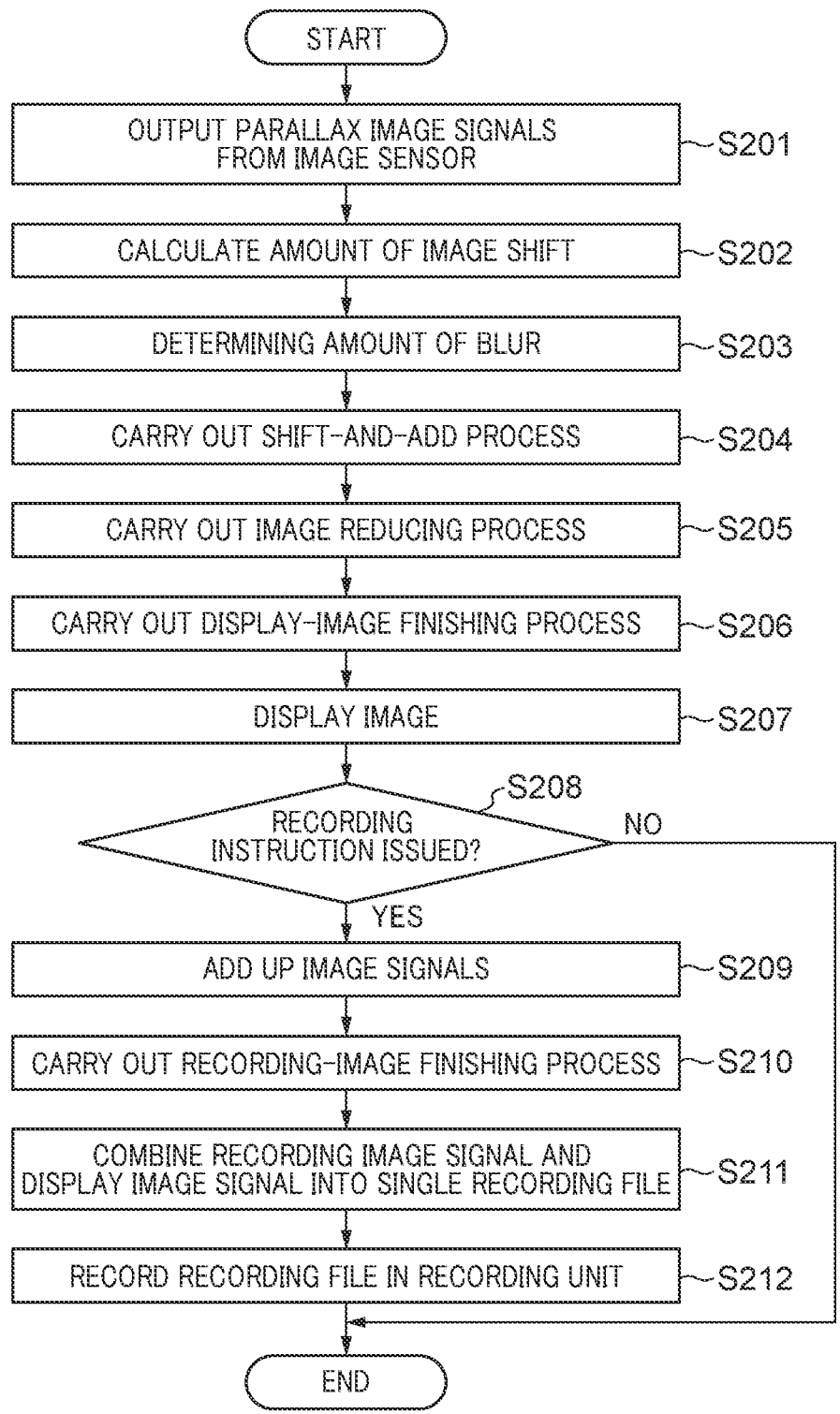
FIG. 2 is a flowchart useful in explaining processes which are carried out by the image processing apparatus in FIG. 1.

A description will now be given of an image processing method (process flow) which is executed in the image processing apparatus 100. FIG. 2 is a flowchart useful in explaining the process flow in the image processing apparatus 100. Processes (steps) designated by S numbers in the flowchart of FIG. 2 are carried out by an MPU of the overall control unit 120 executing a predetermined program to integratedly control operations of the components of the image processing apparatus 100.

In S201, the overall control unit 120 controls operations of the image sensor 101 such that the image sensor 101 outputs parallax image signals. The parallax image signals output from the image sensor 101 are input to the recording-image generating unit 102, the shift-and-add unit 104, and the image-shift-amount calculation unit 110.

Figure 3:
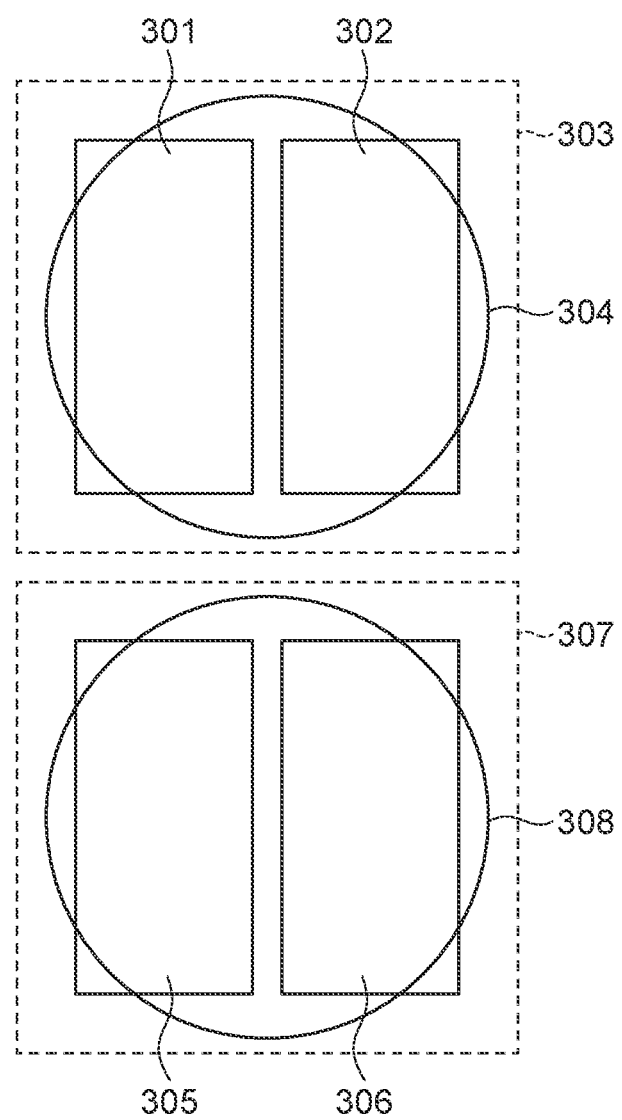
FIG. 3 is a diagram schematically illustrating an arrangement of pixel units of an image sensor used for the image processing apparatus in FIG. 1.

FIG. 3 is a diagram schematically illustrating an arrangement of a part of pixel units constituting the image sensor 101. Each pixel unit includes a plurality of photoelectric converters typified by photodiodes that convert incident light into electric charge. A pixel unit 303 in FIG. 3 has two photoelectric converters 301 and 302, and one micro lens 304 shared by them. Similarly, a pixel unit 307 has two photoelectric converters 305 and 306, and one micro lens 308 shared by them. The image sensor 101 has a structure in which a predetermined number of the pixel units in FIG. 3 are arranged side by side (repeatedly) in a horizontal direction (a left-right direction in FIG. 3) and a vertical direction (an up-down direction in FIG. 3). Since the pixel units 303 and 307 have the arrangement illustrated in FIG. 3, the overall control unit 120 is able to obtain image signals for respective light fluxes differing in the direction of incidence by taking out signals separately from the respective photoelectric converters arranged in a pair.

In S201, each of the photoelectric converters of the image sensor 101 outputs an image signal which is an electric signal obtained as a result of photoelectric conversion. Here, an image signal output from a photoelectric converter (the photoelectric converter 301, 305) located on the left-hand side of each pixel unit in the image sensor 101 is defined as a first parallax image, and an image signal output from a photoelectric converter (the photoelectric converter 302, 306) located on the right-hand side of each pixel unit in the image sensor 101 is defined as a second parallax image.

It should be noted that the image sensor 101 is also capable of adding up electric signals generated by a pair of the photoelectric converters (the photoelectric converters 301, 302 and the photoelectric converters 305, 306) on the left-hand side and right-hand side for each pixel unit inside the image sensor 101, and then outputting an image signal obtained by the addition. A description will be given later of the image sensor 101 that outputs an image signal obtained by the addition in a second embodiment.

Figure 4:
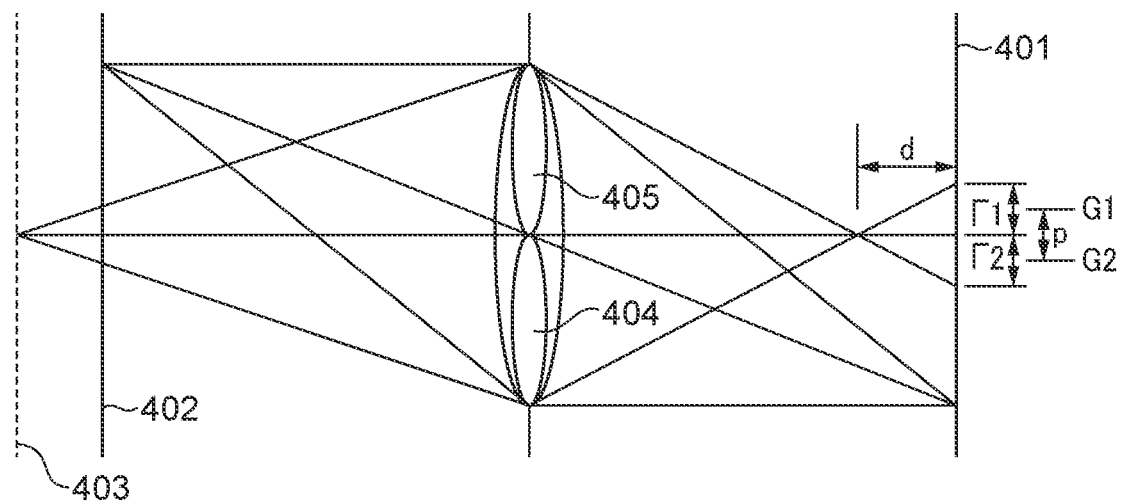
FIG. 4 is a view illustrating the relationship between the amount of defocus and the amount of image shift relating to a first parallax image and a second parallax image according to the first embodiment.

In S202, the overall control unit 120 causes the image-shift-amount calculation unit 110 to calculate the amount of image shift using the parallax image signals output from the image sensor 101. FIG. 4 is a view illustrating the relationship between the amount of defocus of the first parallax image and the second parallax image and the corresponding amount of image shift between the first parallax image and the second parallax image. The exit pupil of the image pickup optical system 50 is divided into two i.e., a pupil partial area 404 and a pupil partial area 405. The amount of defocus "d" is defined as explained hereafter. An absolute value |d| is defined as a distance from a position where an image of a subject is formed to the image pickup surface 401 of the image sensor 101. A sign of the amount of defocus "d" is negative (d<0) in a state in which a position where a subject image (an optical image) is formed is on the subject side of the image pickup surface 401 of the image sensor 101 (front focus state), and is positive (d>0) in a state in which the subject image is formed is across the image pickup surface 401 from the subject side (back focus state). The front focus state (d<0) and the back focus state (d>0) are collectively referred to as a defocus state (|d|>0). In the state in which the position where the subject image is formed on the image pickup surface 401, that is, at an in-focus position (in-focus state in which focus is achieved), d=0 holds.

In FIG. 4, a subject 402 is in a position where it is in focus (d=0). On the other hand, a subject 403 is in front focus position (d<0). When the subject is in front focus position, a light flux that has passed through the pupil partial area 404 among light fluxes from the subject 403 converges once, then spreads out over a width of Γ1 around the center of gravity G1 of the light flux, and forms into a blurred image on the image pickup surface 401. This image is received by the photoelectric converter 301 (305) constituting each pixel unit 303 (307) of the image sensor 101 to generate the first parallax image. As a result, the first parallax image is captured as an image of the subject 403 (subject image) blurred over the width of Γ1 around the center of gravity G1 on the image pickup surface 401. The width of Γ1 of blur shown by the subject image is substantially proportional to the absolute value |d| of the amount of defocus "d".

Likewise, a light flux that has passed through the pupil partial area 405 spreads out over a width of Γ2 around the center of gravity G2 of the light flux, and forms into a blurred image on the image pickup surface 401. This image is received by the photoelectric converter 302 (306) to generate the second parallax image. As a result, the second parallax image is captured as an image of the subject 403 (subject image) blurred over the width of Γ2 around the center of gravity G2 on the image pickup surface 401. The width of Γ2 of blur shown by the subject image is also substantially proportional to the absolute value |d| of the amount of defocus "d". Therefore, an absolute value |p| of the amount of image shift "p" (=G1−G2, which is a difference between the centers of gravity G1 and G2) is also substantially proportional to the absolute value |d| of the amount of defocus "d". It should be noted that description of the back focus state (d>0) is omitted here because it is the same as the front focus state except that when the subject is in the back focus position, a direction of image shift between the first parallax image and the second parallax image is opposite to that in the case where the subject is in the front focus position.

Thus, as the absolute value |d| of the amount of defocus "d" of the first parallax image and the second parallax image increases, the absolute value |p| of the amount of image shift "p" between the first parallax image and the second parallax image also increases. It is clear from the present embodiment that the amount of image shift "p" and the amount of blur are substantially proportional to each other because the amount of defocus "d" is obtained by calculating the amount of image shift "p" between the first parallax image and the second parallax image, and the amount of defocus "d" is substantially proportional to the widths of Γ1 and Γ2.

The overall control unit 120 causes the image-shift-amount calculation unit 110 to calculate the amount of image shift "p" between the first parallax image and the second parallax image by performing a correlated calculation typified by a SAD (Sum of Absolute Difference) calculation between these two parallax images. The amount of image shift "p" may be obtained with respect to each pixel constituting the first parallax image or the second parallax image or may be calculated with respect to each area defined by a predetermined number of pixels.

In S203, the overall control unit 120 causes the blur-amount determination unit 111 to, based on the amount of image shift obtained by the image-shift-amount calculation unit 110, determine the amount of blur (the amount of shift "s") in an area where an image shift occurs in the two parallax images (parallax image signals).

Figure 5A:
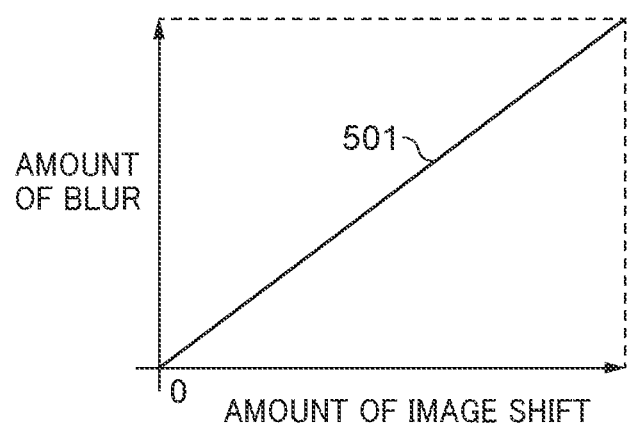
FIGS. 5A to 5C are views illustrating the relationship between the amount of image shift and the amount of blur and the relationship between the amount of image shift and the adjusted amount of blur according to the first embodiment.
Figure 5B:
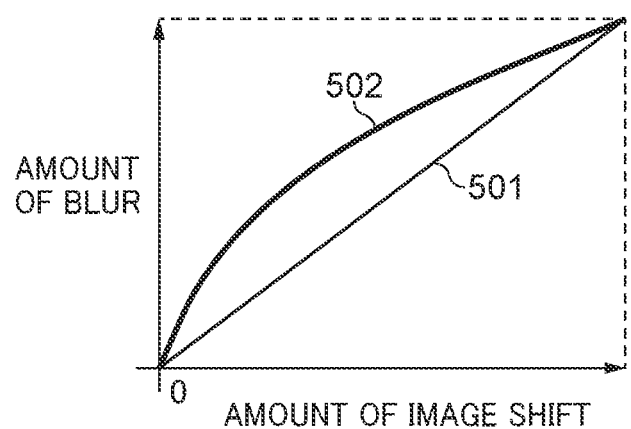

FIG. 5A is a view (graph) illustrating the relationship between the amount of image shift obtained by the image-shift-amount calculation unit 110 and the amount of blur. It is assumed that the amount of image shift and the amount of blur are proportional to each other as indicated by a straight line 501. FIG. 5B is a view illustrating an example in which the amount of blur is determined based on the amount of image shift. In the example in FIG. 5B, the amount of blur is determined such that it becomes greater than the amount of blur indicated by the straight line 501 within a range where an image shift occurs (that is, a range where the amount of image shift is greater than zero). Namely, the amount of blur is determined such that a relationship in which the amount of blur is more emphasized with respect to the amount of image shift as indicated by a curve 502 is implemented in contrast to the proportional relationship between the amount of image shift and the amount of blur indicated by the straight line 501. In other words, the amount of blur is determined such that it becomes greater than the amount of blur shown by a subject image defocused by the amount of defocus converted from the amount of image shift. It is assumed that the relationship between the amount of image shift and the amount of blur indicated by the curve 502 is stored in advance in a storage device which the blur-amount determination unit 111 has or a storage device such as a ROM of the overall control unit 120.

It should be noted that the relationship between the amount of image shift and the amount of blur may be determined based on parameters of the image pickup optical system 50. For example, the amount of blur may be determined based on an f-number (aperture value) of the image pickup optical system 50 and the amount of image shift. When the f-number of the image pickup optical system 50 is low, the depth of field is shallow because the pupil partial areas 404 and 405 illustrated in FIG. 4 are large. On the other hand, when the f-number of the image pickup optical system 50 is high, the depth of field is deep because the pupil partial areas 404 and 405 illustrated in FIG. 4 are small. When the depth of field is deep, the amount of defocus changes a little with respect to the amount of focus lens adjustment, and hence a change as a blur is small when a subject is brought into focus (focus is achieved). For this reason, by determining the amount of blur such that the relationship between the amount of image shift and the amount of blur is emphasized when the f-number of the image pickup optical system 50 is high, the amount of blur can be large even with a small amount of image shift. The overall control unit 120 may also cause the image-shift-amount calculation unit 110 to calculate the amount of image shift based on the aperture value of the image pickup optical system 50.

In general, the depth of field has the property of differing at the rear (far) and the front (near) with respect to a subject being in focus, and is shallower at the front than at the rear. Accordingly, the overall control unit 120 causes the image-shift-amount calculation unit 110 to define one of the first parallax image signal and the second parallax image signal as a comparison basis and calculate the amount of image shift with a positive or negative sign with respect to the amount of image shift 0 (zero). Thus, as is clear from FIG. 4, it can be determined whether or not a subject is at the front or rear of an in-focus position. By changing the amount of blur according to the obtained amount of image shift and its sign, the amount of blur can be determined such that, for example, the front depth of field and the rear depth of field are equal. As a result, the way of blurring can be the same when a focus position is shifted frontward or rearward.

Figure 5C:
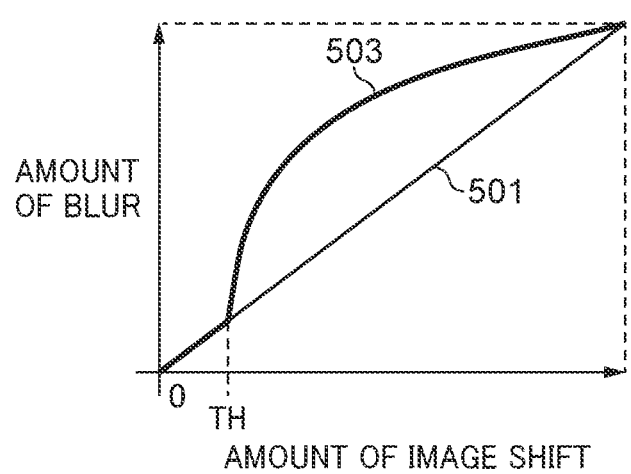

FIG. 5C is a view illustrating another example in which the amount of blur is determined based on the amount of image shift. In FIG. 5C, the relationship between the amount of image shift and the amount of blur is indicated by a line 503. The overall control unit 120 causes the blur-amount determination unit 111 to determine the amount of blur using the proportional relationship between the amount of image shift and the amount of blur indicated by the straight line 501 in FIG. 5A in a range where the amount of image shift is between zero and a predetermined threshold value TH. The overall control unit 120 then causes the blur-amount determination unit 111 to determine the amount of blur such that it is greater than the amount of blur indicated by the straight line 501 in a range where the amount of image shift is greater than the threshold value TH. The threshold value TH may be either zero or a value greater than zero.

The amount of blur should not necessarily be determined in the above-described manner. The overall control unit 120 may cause the blur-amount determination unit 111 to determine the amount of blur using the relationship in which the amount of blur remains constant in a region where the amount of image shift is greater than the threshold value TH, although this is not illustrated. In this case, the overall control unit 120 may cause the blur-amount determination unit 111 to determine the threshold value TH based on parameters of the image pickup optical system 50. For example, when the aperture value of the image pickup optical system 50 is low, the threshold value TH is set at a reduced value, and the amount of blur is determined such that it is large even when the amount of image shift is small. As a result, the amount by which the focus lens is adjusted can be small. It should be noted that a specific amount of blur is the amount of shift between the first parallax image signal and the second parallax image signal used by the shift-and-add unit 104.

Figure 6:
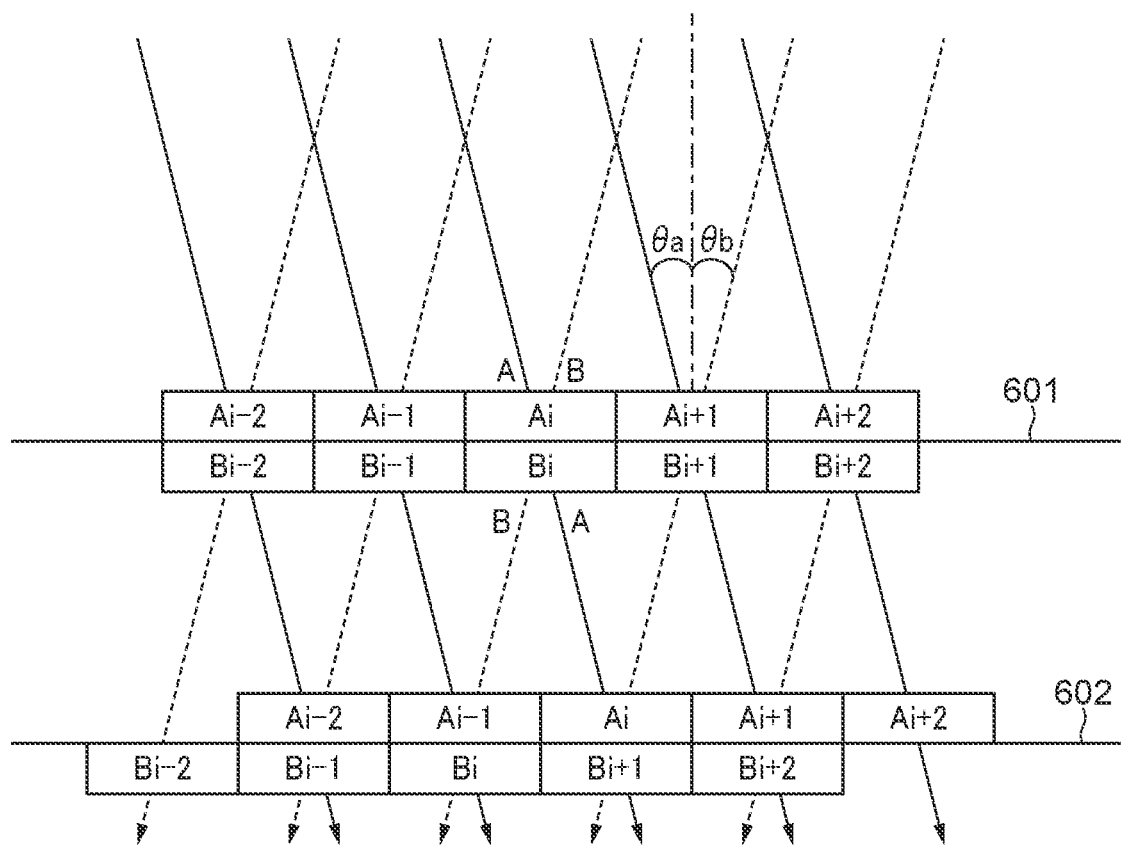
FIG. 6 is a schematic diagram useful in explaining a shift-and-add process works according to the first embodiment.

In S204, the overall control unit 120 causes the shift-and-add unit 104 to carry out the shift-and-add process on the first parallax image and the second parallax image based on the amount of blur output from the blur-amount determination unit 111. FIG. 6 is a schematic view illustrating in detail the shift-and-add process. In the schematic view of FIG. 6, "i" is an integer, and a first parallax image and a second parallax image obtained by the pixel unit 303 in the i-th row of the image sensor 101 disposed on an image pickup surface 601 are designated by Ai and Bi. The first parallax image Ai is an image formed by an image signal corresponding to a light flux entering the i-th pixel unit 303 at a principal ray angle θa, which relates to the pupil partial area 404 in FIG. 4. The second parallax image Bi is an image formed by an image signal corresponding to a light flux entering the i-th pixel unit 303 at a principal ray angle θb, which relates to the pupil partial area 406 in FIG. 4. It should be noted that the principal ray angles θa and θb are angles between the normal to the image pickup surface 601 and a line corresponding to the center of gravity of the incident light flux.

The first parallax image Ai and the second parallax image Bi have incident angle information as well as light intensity distribution information. Considering the following process will give a good understanding of how can generate a reconstructed image on a virtual image forming surface 602, that is, an image obtained in a case where the image pickup surface 601 has shifted to the image virtual image forming surface 602. First, the first parallax image Ai is translated to the virtual image forming surface 602 along the direction of the light flux. Next, the second parallax image Bi is translated to the virtual image forming surface 602 along the direction of the light flux. Then, by adding these parallax images together after their translational movement, a reconstructed image on the virtual image forming surface 602 is generated.

Here, assume that the amounts of translational movement of both the first parallax image Ai and the second parallax image Bi correspond to 0.5 pixel in the horizontal direction. In this case, translating the first parallax image Ai to the virtual image forming surface 602 along the light flux is equivalent to shifting the first parallax image Ai by +0.5 pixel in the horizontal direction. Translating the second parallax image Bi to the virtual image forming surface 602 along the light flux is also equivalent to shifting the second parallax image Bi by −0.5 pixel in the horizontal direction. Thus, by shifting the first parallax image Ai and the second parallax image Bi by +1 pixel relatively to each other, that is, by adding the first parallax image Ai and the second parallax image Bi+1 together, the reconstructed image on the virtual image forming surface 602 is generated.

By shifting and adding the first parallax image Ai and the second parallax image Bi, the correspondence between the amount of movement of an image forming surface and the amount of shift when the image forming surface is moved is determined by the degrees of the principal ray angle θa and the principal ray angle θb. The amount of shift in the shift-and-add process is represented by "s"; the row number, "j"; the column number, "i"; the first parallax image, A(j, i); and the second parallax image, B(j, i). The shift-and-add process is expressed by an equation 1 below, where a reconstructed image obtained by shifting and adding those parallax images is represented by I (j, i; s).

$$I(j,i;s)=A(j,i)+B(j,i+s) \qquad \text{Equation 1}$$

In the first embodiment, the first parallax image A(j, i) and the second parallax image B(j, i) are arranged in the Bayer pattern, and hence the parallax images of the same color can be added together if the amount of shift s is a multiple of 2. Namely, the amount of shift "s" is expressed by s=2n (n is an integer). By varying the amount of shift s according to the amount of image shift between parallax images, the amount of movement of the image surface can be varied on a pixel-by-pixel basis or area-by-area basis. It should be noted that the blur-amount determination unit 111 makes the determination to vary the amount of shift "s" according to the amount of image shift.

In the first embodiment, the shift-and-add unit 104 receives the amount of shift "s", which is the amount of blur, from the blur-amount determination unit 111 and carries out the shift-and-add process described above on a pixel-by-pixel basis or area-by-area basis. This makes it possible to move the image surface according to the amount of image shift, that is, carry out a blurring process. It should be noted that the reconstructed image may be generated after interpolation signals between pixels of the first parallax image A(j, i) and the second parallax image B(j, i) are generated.

As a result, the amount of shift "s" can be a non-integer, and hence the degree of flexibility in setting the amount of shift s can be increased.

In S205, the overall control unit 120 causes the image reducing unit 105 to carry out a reducing process in which it reduces an image signal output from the shift-and-add unit 104. The image reducing unit 105 receives such a reduction rate from the overall control unit 120 that the number of pixels can be suitable for display on the display unit 107 and then reduces the size of the image signal according to the received reduction rate. It should be noted that when the number of pixels in a plurality of parallax image signals obtained from the image sensor 101 is equal to the number of pixels in the liquid crystal panel or the like of the display unit 107, there is no need to carry out the reducing process using the image reducing unit 105, and hence the process in S205 can be skipped.

In S206, the overall control unit 120 causes the display-image finishing unit 106 to carry out a finishing process like white balance process, demosaicing and/or color conversion on the image signal from the image reducing unit 105. The display-image finishing unit 106 further generates a display image signal by converting the image signal subjected to the finishing process into a YUV signal and outputs the display image signal to the display unit 107 and the recording control unit 108.

In S207, the overall control unit 120 causes the display unit 107 to display an image using the display image signal. In S208, the overall control unit 120 judges whether or not a recording instruction has been issued through an operating unit (an input device or user interface, like a touch panel or hardware keys) for inputting a recording instruction in response to a recording instruction performed by a user or the like. When the overall control unit 120 judges that the recording instruction has been issued (YES in S208), the process proceeds to S209, and when the overall control unit 120 judges that the recording instruction has not been issued (NO in S208), the present process is ended.

In S209, the overall control unit 120 causes the recording-image generating unit 102 to add up the first parallax image and the second parallax image to generate an image signal for recording. As the arrangement of the image sensor 101 has been described with reference to FIG. 3, an image signal is obtained from light fluxes passing through the entire exit pupil of the image pickup optical system 50 by adding pixels sharing the micro lens 304 together.

In S210, the overall control unit 120 causes the recording-image finishing unit 103 to carry out a finishing process like white balance process, demosaicing and/or color conversion on the image signal from the recording-image generating unit 102. The recording-image finishing unit 103 further generates a recording image signal by converting the image signal subjected to the finishing process into a YUV signal and outputs the recording image signal to the recording control unit 108.

In S211, the overall control unit 120 causes the recording control unit 108 to combine the recording image signal and the display image signal into a single recording file. The recording control unit 108 obtains the recording image signal output from the recording-image finishing unit 103 and the display image signal output from the display-image finishing unit 106 and creates a single file structure as a recording file. For example, in a Tiff (Tagged Image File Format) file structure, multiple pieces of data can be stored in a single file. With such a file format, the recording image signal and the display image signal can be recorded as a single file. In S212, the overall control unit 120 records the recording file output from the recording control unit 108 in the recording unit 109 and ends the present process.

As described above, according to the first embodiment, to cause the display unit 107 to display an image signal output from the image sensor 101, the overall control unit 120 calculates the amount of image shift between a plurality of parallax image signals, and using the amount of image shift, applies the shift-and-add process to the image signal to be displayed. By applying the shift-and-add process to the image signal to be displayed, the out-of-focus area in a display image becomes more blurred than the in-focus area in the display image (the amount of blur is greater in the out-of-focus area than in the in-focus area). It allows a user to easily distinguish between the in-focus area and the out-of-focus area. On this occasion, signal brightness is not increased, and color signals are not superimposed. For this reason, a natural image being in focus can be obtained.

Moreover, according to the first embodiment, the recording image and the display image, to which the blurring process (the shift-and-add process) has been applied, are combined together and recorded as the recording file in the recording unit 109. It allows a user who is reproducing the recording image on a PC or another electric apparatus, to reproduce the display image signal together with the recording image. As a result, the user can easily find which area in the recording image is in focus.

It should be noted that although in the above description, an image signal that has been subjected to the finishing process by the recording-image finishing unit 103 is used as the recording image signal, an image signal that has not yet been subjected to the finishing process may be used as the recording image signal so that after the recording, it can be subjected to the finishing process using software in a PC or another electric apparatus. Moreover, the overall control unit 120 may cause the recording control unit 108 to record at least one parallax image signal, which has not been subjected to the blurring process, in the recording unit 109. Furthermore, in a case where a user has issued an instruction to enlarge an image via the operating unit (the input device or user interface), only a designated area to be enlarged is subjected to the blurring process and displayed so that processing time required for the blurring process can be shortened. Likewise, in a case where a user has designated a partial area, only this area is subjected to the blurring process so that processing time required for the blurring process can be shortened.

Figure 7:
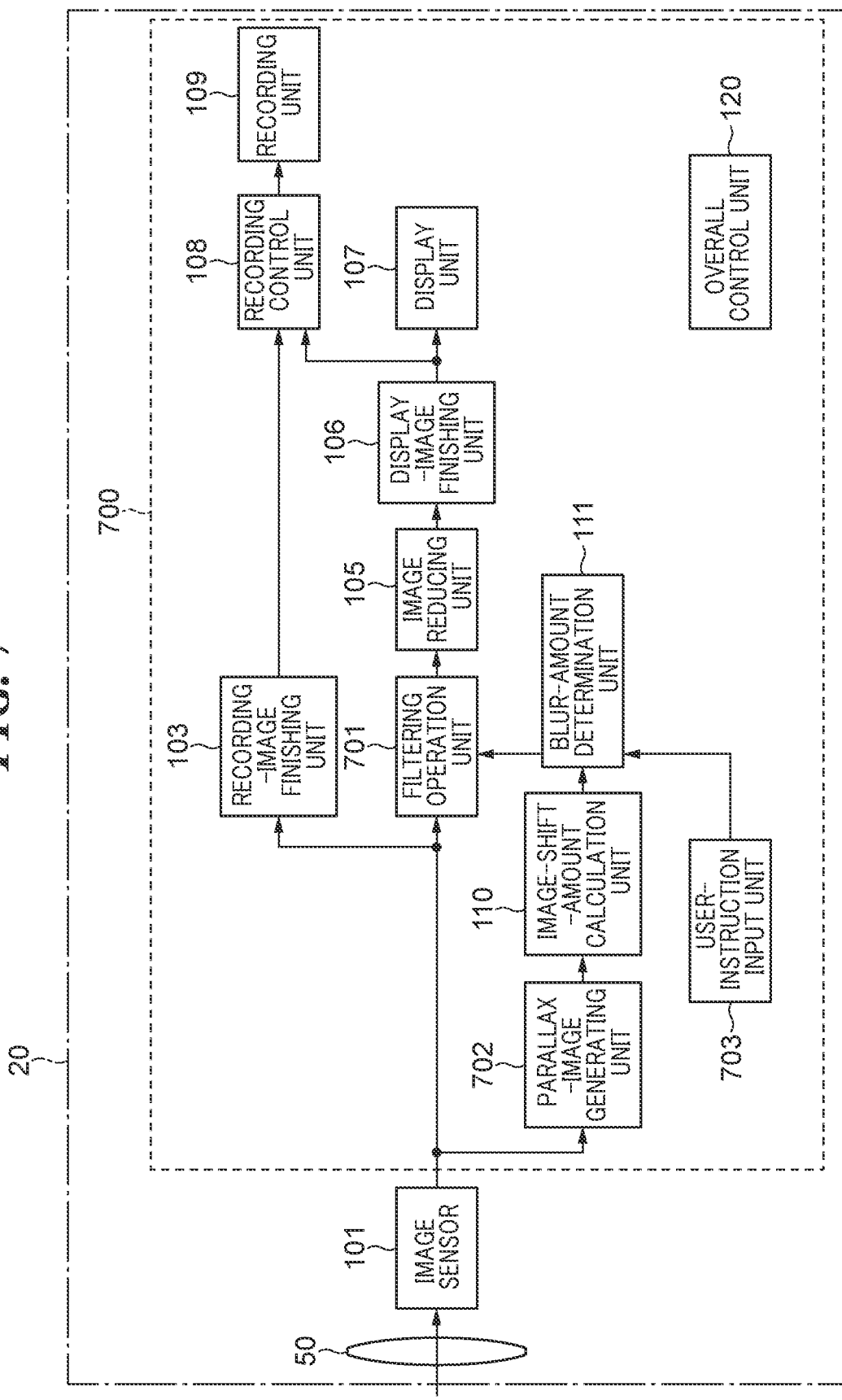
FIG. 7 is a block diagram of an image processing apparatus according to a second embodiment.

FIG. 7 is a block diagram of an image pickup apparatus 20 according to a second embodiment of the disclosure. The image processing apparatus 20 includes the image pickup optical system 50, the image sensor 101, and an image processing apparatus 700. The image processing apparatus 700 is configured to use a filtering operation for the blurring process.

The image processing apparatus 700 includes a recording-image generating unit 102, a recording-image finishing unit 103, an image reducing unit 105, a display-image finishing unit 106, a display unit 107, a recording control unit 108, a recording unit 109, and an image-shift-amount calculation unit 110, which are equivalent to the component elements of the image processing apparatus 100 according to the first embodiment. Description thereof is omitted here. The image processing apparatus 700 includes a blur-amount determination unit 111, the name of which is the same as that of the component element of the image processing apparatus 100 according to the first embodiment, but as will be described later, processes carried out by the blur-amount determination unit 111 are different from those carried out in the first embodiment.

The image processing apparatus 700 further includes a filtering operation unit 701, a parallax-image generating unit 702, and a user-instruction input unit 703. The filtering operation unit 701 is configured to carry out a filtering operation on an image signal output from the image sensor 101. The parallax-image generating unit 702 is configured to generate a second parallax image from a first parallax image output from the image sensor 101 and an added image signal. The user-instruction input unit 703, which is an input device or user interface, like a touch panel or hardware keys, is configured to receive an instruction from a user and sends the instruction to the blur-amount determination unit 111. It should be noted that the image sensor 101 is configured to output an image signal obtained as a result of conversion by the photoelectric converter 301 (see FIG. 3) as the first parallax image, and output an image signal obtained by adding image signals, which have been obtained as a result of conversion by the photoelectric converters 301 and 302, together as the added image signal.

Figure 8:
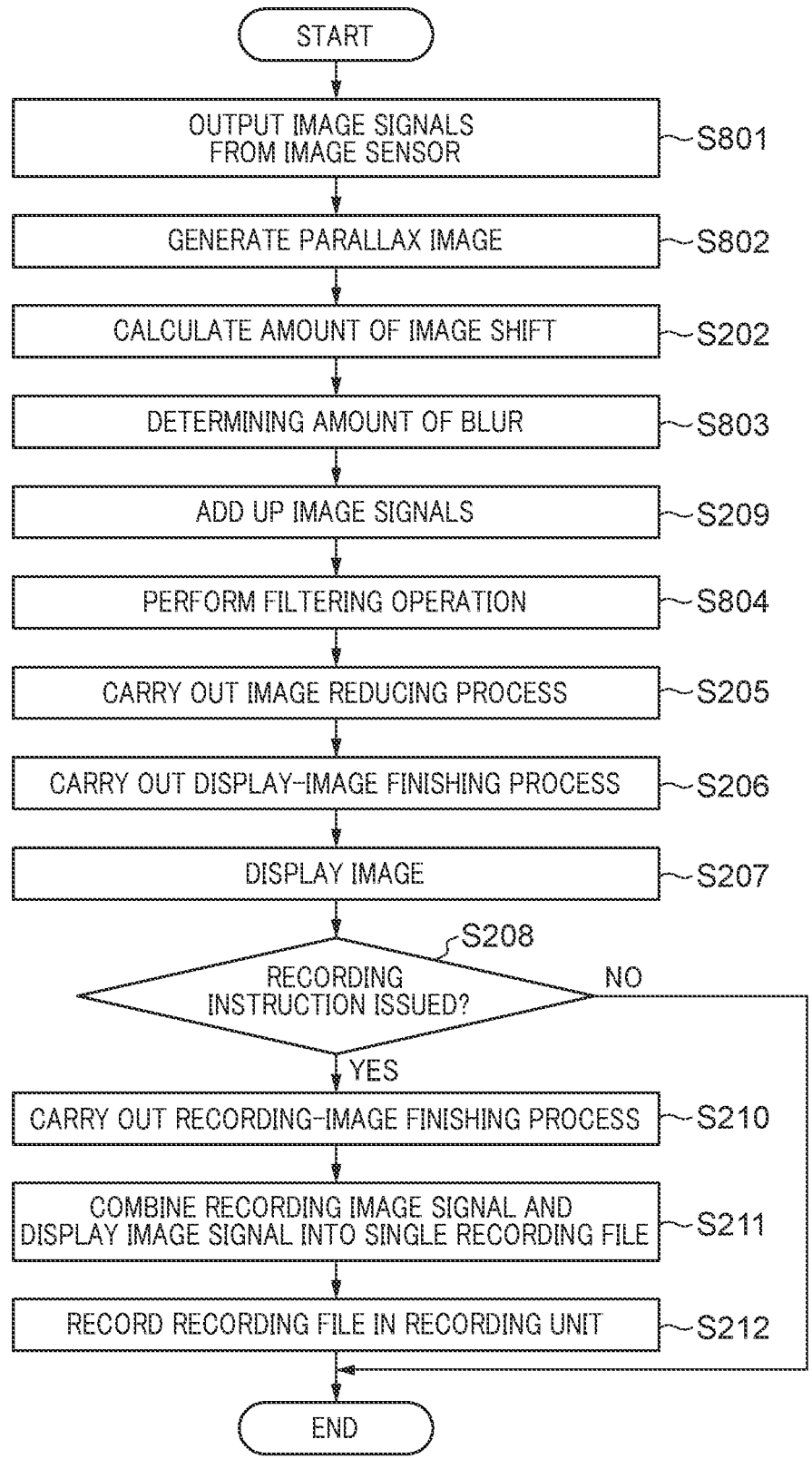
FIG. 8 is a flowchart useful in explaining processes which are carried out by the image processing apparatus in FIG. 7.

A description will now be given of an image processing method (processing flow) which is executed in the image processing apparatus 700. FIG. 8 is a flowchart useful in explaining the processing flow in the image processing apparatus 700. Processes (steps) designated by S numbers in the flowchart of FIG. 8 are carried out by an MPU of the overall control unit 120 executing a predetermined program to integratedly controlling operations of the components of the image processing apparatus 700. It should be noted that in the flowchart of FIG. 8, the same processes (steps) as those in the flowchart of FIG. 2 are designated by the same S numbers, and description thereof is omitted here.

In S801, the overall control unit 120 controls operations of the image sensor 101 such that the image sensor 101 outputs the first parallax image and the added image signal. The image signals output from the image sensor 101 are input to the recording-image finishing unit 103, the filtering operation unit 701, and the parallax-image generating unit 702.

In S802, the overall control unit 120 causes the parallax-image generating unit 702 to generate the second parallax image from the first parallax image and the added image signal. The added image signal is obtained by adding outputs from the photoelectric converters 301 and 302 (305, 306) of the pixel unit 303 (307) together, and hence the second parallax image is generated by subtracting the first parallax image from the added image signal with respect to each set of corresponding coordinates. The parallax-image generating unit 702 outputs the first parallax image obtained from the image sensor 101 and the generated second parallax image to the image-shift-amount calculation unit 110.

In S803, the overall control unit 120 causes the blur-amount determination unit 111 to determine the amount of blur based on the amount of image shift output from the image-shift-amount calculation unit 110 and instruction information output from the user-instruction input unit 703.

Figure 9A:
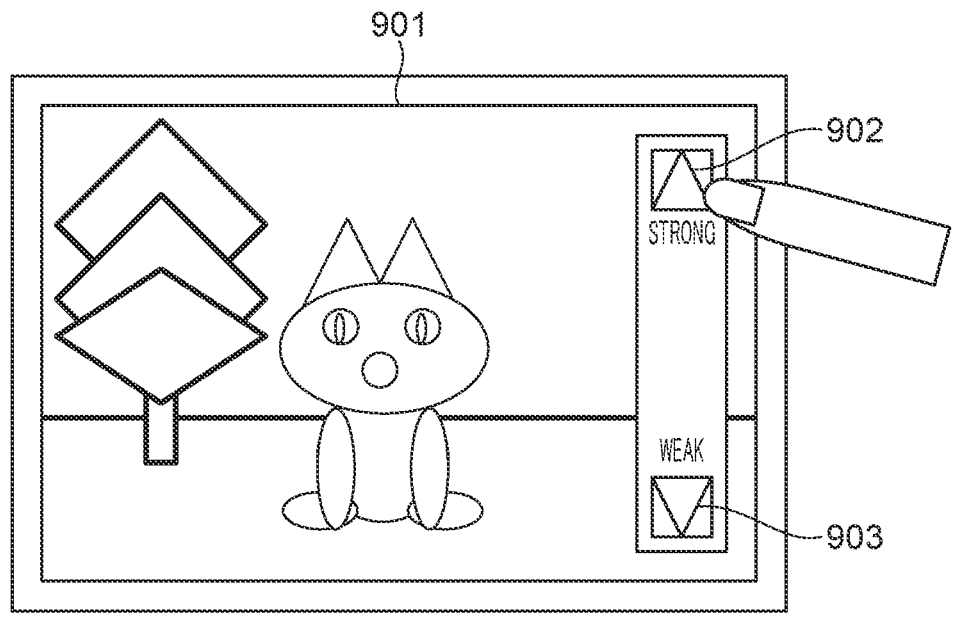
FIGS. 9A and 9B are views schematically illustrating examples of how a user specifies the amount of blur according to the second embodiment.

FIG. 9A is a view schematically illustrating an embodiment of how a user specifies the amount of blur. A capacitive touch panel, for example, is superimposed on the screen 901 of the display unit 107 (a display device like a liquid crystal panel). Input GUIs 902 and 903, which are images prompting a user to do input, are displayed on the screen 901 while a display image is being displayed. It should be noted that the input GUIs 902 and 903 are elements of the user-instruction input unit 703.

When a user wants to have stronger blur, he or she touches the GUI 902. As a result, instruction information indicating an instruction to strengthen blur is output to the blur-amount determination unit 111. On the other hand, when a user wants to have weaker blur, he or she touches the GUI 903. As a result, instruction information indicating an instruction to weaken blur is output to the blur-amount determination unit 111. It should be noted that the same effects can be obtained by using an index indicating the degree of blur instead of expressions "Strong" and "Weak". In this case, lowering the aperture value as an index increases the degree of blur, and raising the aperture value will decrease the degree of blur.

Figure 9B:
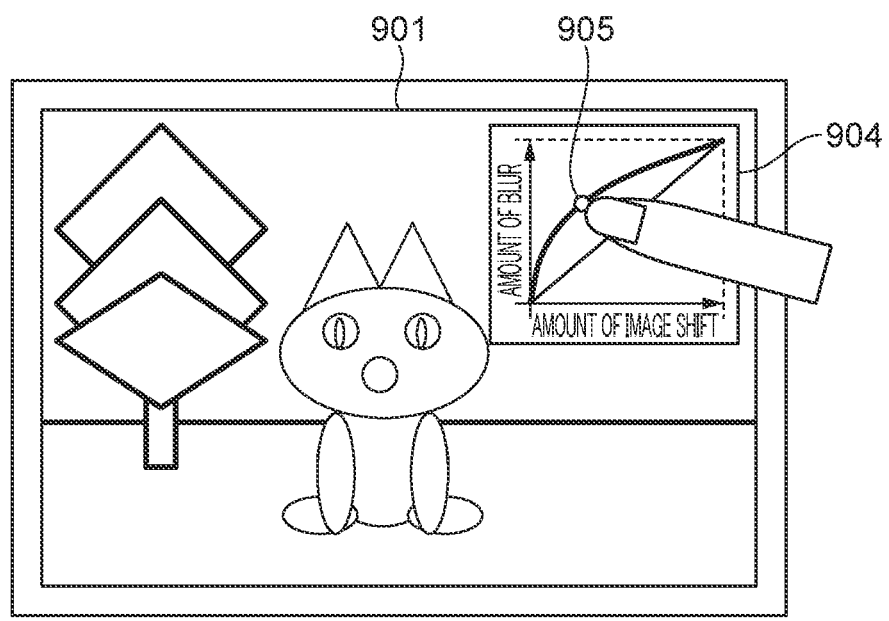

FIG. 9B is a view schematically illustrating another embodiment of how a user specifies the amount of blur. A graph 904 which indicates the relationship between the amount of image shift and the amount of blur is displayed within the screen 901. A user touches an operating point 905 within the graph 904 with his or her finger and drags the operating point 905 to specify an amount of blur. When the user moves his or her finger off the amount of blur, the amount of blur corresponding to the position of the operating point 905 at that point is output as instruction information to the blur-amount determination unit 111. It should be noted that this is not limitative, but the threshold value TH illustrated in FIG. 5C may be specified (input as a numeric value) via the touch panel, and the specified value (input value) may be output as instruction information to the blur-amount determination unit 111. It should be noted that a specific amount of blur determined by the blur-amount determination unit 111 is a filter coefficient to be used by the filtering operation unit 701.

Figure 10:
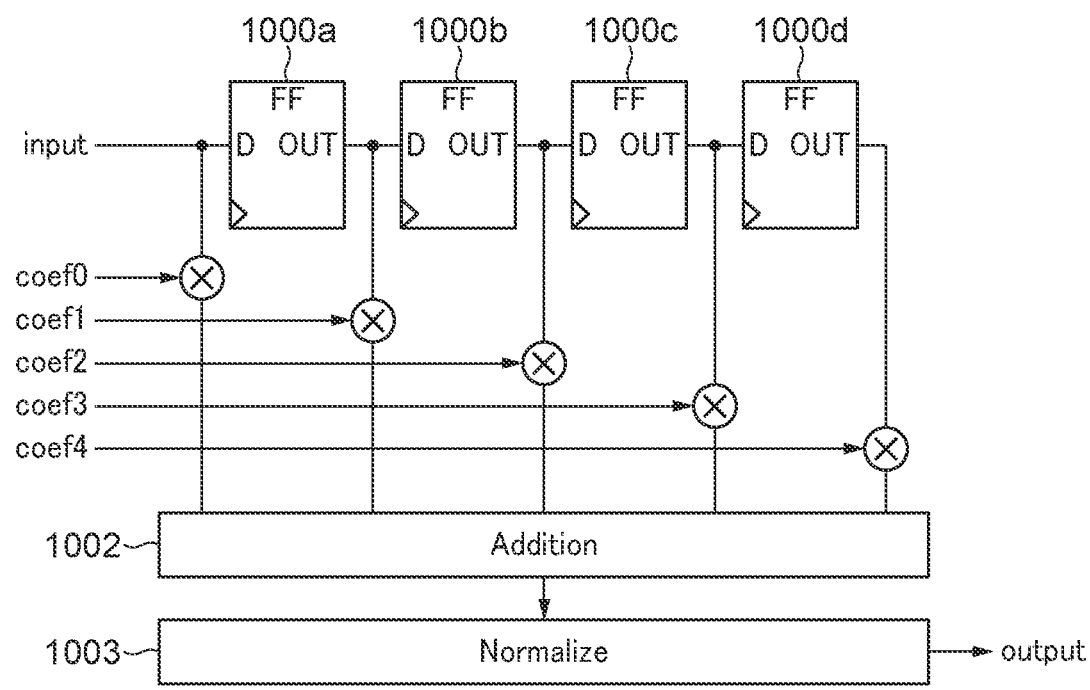
FIG. 10 is a diagram schematically illustrating an arrangement of a digital filtering operation circuit according to the second embodiment.

In S804, the overall control unit 120 causes the filtering operation unit 701 to perform digital filtering on the added image signal output from the image sensor 101 and outputs an image signal obtained by the digital filtering to the image reducing unit 105. FIG. 10 is a view illustrating an example of an arrangement of an operation circuit which performs the digital filtering. In this operation circuit, the added image signal is input from an input terminal, and five pixel signals delayed by delay elements 1001*a* to 1001*d* are multiplied by filter coefficients coef0 to coef4, respectively, combined together by an adder 1002, and then normalized by a normalization circuit 1003. Filtering operation results are output from an output terminal in each cycle.

It should be noted that the filtering operation circuit may have any arrangement as long as it is capable of performing a computation expressed by an equation 2 below. In the equation 2, "C" represents a filter coefficient, "P" represents a signal level of one pixel in an added image signal that has been input, and "POi" represents a signal level of one pixel after the filtering operation.

$$PO_i = \frac{1}{N} \sum_{m=-2}^{+2} (C_{m+2} \cdot P_{m+l}),$$

$$\text{where } N = \sum_{m=-2}^{+2} C_{m+2}$$

Equation 2

In the second embodiment, the blurring process is implemented by the filter processing, and thus the filter coefficients are determined such that low-pass filtering (LPF) is performed. The filtering operation unit 701 implements the blurring process according to the amount of image shift, by obtaining the filter coefficients coef0 to coef4 from the blur-amount determination unit 111 and carrying out the blurring process with the filter coefficients. Examples of the filter coefficients for strong blur are as follows: coef0=1, coef1=4, coef2=6, coef3=4, and coef4=1. On the other hand, examples of the filter coefficients for weak blur are as follows: coef0=0, coef1=4, coef2=8, coef3=4, and coef4=0. It should be noted that the number of filter coefficients to be used is not limited to five, and their values are not limited to those in the above examples. They may be set within a range where it is possible to blur the added image signal.

Figure 11:
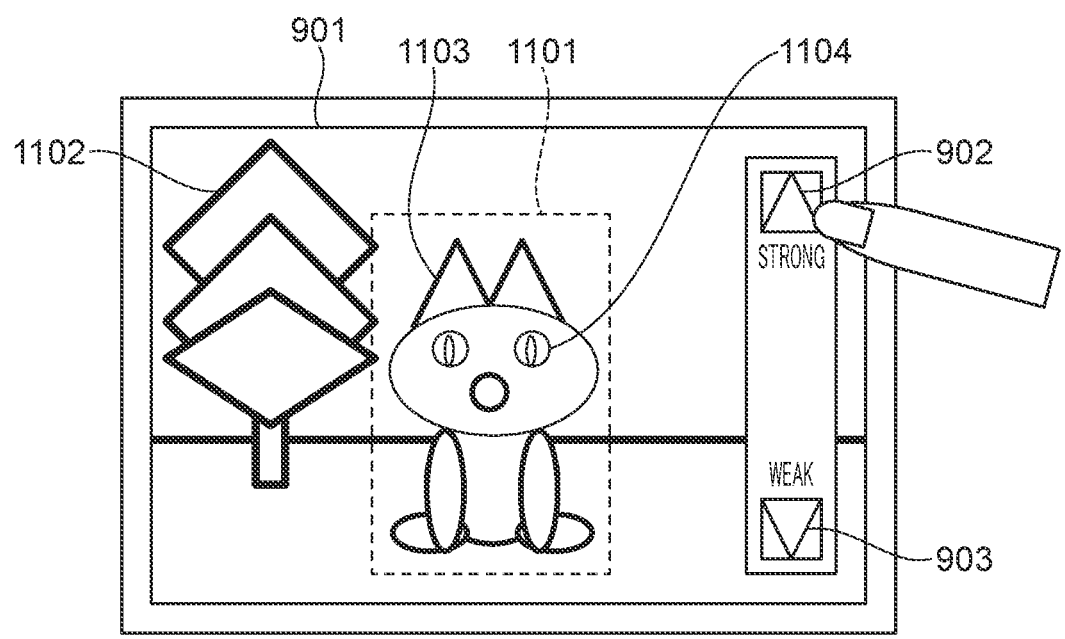
FIG. 11 is a view schematically illustrating an image obtained as a result of an LPF process according to the second embodiment.

FIG. 11 is a view schematically illustrating a display image based on a display image signal subjected to the blurring process and displayed on the screen 901 of the display unit 107. In FIG. 11, thicker lines are used for areas blurred more.

A subject 1101 is to be in focus by a user is indicated by a broken-line frame. When the user touches an input GUI 903, the blur-amount determination unit 111 determines at least one filter coefficient to be used by a filtering operation unit 701 and sends it to the filtering operation unit 701. The filtering operation unit 701 performs the filtering based on the at least one filtering coefficient obtained, and after the filtering, a display image signal is displayed on the screen 901.

Here, when eyes 1104 which are part of the subject 1101 are in focus, ears 1103 which are other areas of the subject 1101 are out of focus because they are at the rear of the eyes 1104. Thus, there is a certain amount of image shift with respect to the eyes 1104 in the area of ears 1103, and hence the blurring process is carried out through the filtering on this area. Another subject 1102 lies at the rear of the subject 1101 (the eyes 1104, the ears 1103), and hence it has a greater amount of image shift than the ears 1103. Accordingly, the blurring process is carried out on the subject 1102 such that it is blurred more strongly than the subject 1101.

As described above, in the second embodiment, when an image signal output from the image sensor 101 is to be displayed on the display unit 107, the amount of image shift between a plurality of parallax image signals is calculated, and based on the calculated amount of image shift, the filtering is applied to an image signal to be displayed. As a result, as with the first embodiment, the amount of blur is greater in an out-of-focus area than in an in-focus area, and a user can easily distinguish between the in-focus area and the out-of-focus area. Moreover, since the user can specify the strength of blur by operating the touch panel or the like, and the filtering is performed based on the specified information, the user can adjust the strength of blur while looking at an image to be displayed.

It should be noted that the image pickup apparatus 20 is configured to switch between an auto focus mode in which a subject is automatically brought into focus and a manual focus mode in which a user brings a subject into focus by adjusting the position of the focus lens in the image pickup optical system 50. In the manual focus mode, the overall control unit 120 performs the blurring process and displays a display image signal subjected to the blurring process on the display unit 107. Therefore, even when it is difficult for a user to manually adjust the focus during image pickup, the user can easily recognize which part is in focus.

Moreover, a user may select whether or not to perform the blurring process on a display image signal, so that adjusting focus and checking previews of recorded images can be quickly switched. An example of this will be described below with reference to FIG. 12.

Figure 12:
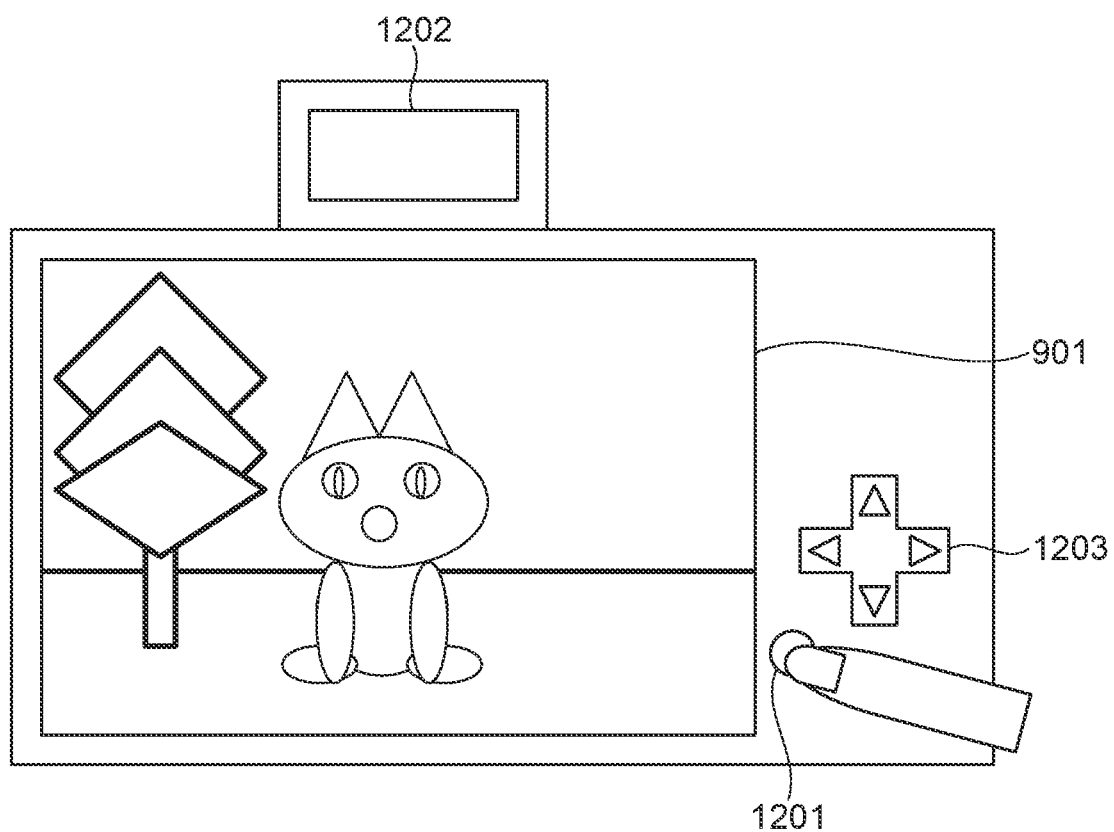
FIG. 12 is a view schematically illustrating an example of an arrangement in which whether or not to carry out a blurring process is selectable according to the second embodiment.

FIG. 12 is a view schematically illustrating an example of an arrangement in which whether or not to carry out the blurring process (whether to enable or disable the blurring process) can be selected. A selector button 1201 is an operating unit (an input device or user interface) for inputting information for selecting whether or not to carry out the blurring process. Whenever the selector button 1201 is depressed, a display image signal that has been subjected to the blurring process or a display image signal that has not been subjected to the blurring process is selectively displayed.

In the arrangement shown in FIG. 12, the display unit 107 includes an electronic viewfinder 1202 as well as the liquid crystal panel. A display image signal is displayed on the electronic viewfinder 1202 as with the screen 901. A user is able to achieve focus and switch previews of recorded images by depressing a selector button 1201 while viewing the display image signal through the electronic viewfinder 1202. As a result, the possibility that a photo opportunity will be missed is decreased.

Moreover, in the arrangement shown in FIG. 12, the user-instruction input unit 703 includes a cross button 1203. By setting the degree of blur through the cross button 1203, a user is able to set the degree of blur of an image signal for reproduction, which is being brought into focus, by looking through the electronic viewfinder 1202, and hence the ease of operation is improved.

Other Embodiments

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, in the embodiments described above, each of the image processing apparatuses 100 and 700 does not include the image sensor 101 as their component element, but may include the image sensor 101 as their component element. Moreover, in the image pickup apparatuses 10 and 20, the image pickup optical system 50 and the image sensor 101 are constructed integrally with the image processing apparatuses 100 and 700. This is not limitative, but the image pickup optical system 50 and the image sensor 101 and the image processing apparatuses 100 and 700 may be configured as separate units and placed at different locations, like a surveillance camera system and connected together via a network like the Internet. In this case, the image processing apparatuses 100 and 700 may not integrally be equipped with the recording unit 109 and may have an external recording device connected to the image processing apparatuses 100 and 700 using a known communication apparatus such that it is capable of communicating with the image processing apparatuses 100 and 700.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2020-085946, filed on May 15, 2020 which is hereby incorporated by reference herein in its entirety.

What is claimed is:

1. An apparatus comprising:
   at least one processor; and
   a memory coupled to the at least one processor, the memory having instructions that, when executed by the at least one processor, perform to:
   obtain a plurality of parallax image signals representing a plurality of parallax images;
   calculate an amount of image shift between the plurality of parallax image signals;
   determine an amount of blur in an area in which an image shift occurs in the plurality of parallax image signals based on the amount of image shift;
   carry out a blurring process on at least one of the plurality of parallax image signals based on the amount of blur;
   generate a display image signal based on the at least one of the plurality of parallax image signals subjected to the blurring process;
   display an image based on the display image signal on a display; and
   determine the amount of blur such that the amount of blur determined based on the amount of image shift is greater than an amount of blur shown by a subject image defocused by an amount of defocus converted from the amount of image shift.

2. The apparatus according to claim 1, further comprising a storage device in which a relationship between the amount of image shift and the amount of blur is stored in advance, wherein the instructions further perform to determine the amount of blur using the relationship stored in the storage device.

3. The apparatus according to claim 1, wherein the instructions further perform to determine the amount of blur based on an f-number of an image pickup optical system used for picking up the plurality of parallax images, and the amount of image shift.

4. The apparatus according to claim 1, wherein the instructions further perform to determine the amount of blur such that a rear depth of field and a front depth of field are equal to each other.

5. The apparatus according to claim 1, wherein the instructions further perform to determine an amount of shift between the plurality of parallax image signals as the amount of blur, and generate the display image signal by shifting and adding the plurality of parallax image signals using the amount of shift.

6. The apparatus according to claim 1, wherein the instructions further perform to determine a filter coefficient of a low-pass filter as the amount of blur, and generate the display image signal by performing low-pass filtering on at least one of the plurality of parallax image signals using the filter coefficient.

7. The apparatus according to claim 1, further comprising an input device that specifies an area that is a part of a display image displayed on the display, wherein the instructions further perform to determine the amount of blur for a signal portion of at least one of the plurality of parallax image signals, which corresponds to the area specified by the input device.

8. The apparatus according to claim 1, wherein the instructions further perform to calculate the amount of image shift based on an aperture value of an image pickup optical system used for picking up the plurality of parallax images.

9. The apparatus according to claim 1, further comprising a recording device, wherein the instructions further perform to:

generate a recording image signal obtained by adding up the plurality of parallax image signals, and record the recording image signal and the display image signal in the recording device.

10. The apparatus according to claim 9, wherein the instructions further perform to record at least one of the plurality of parallax image signals, which has not been subjected to the blurring process, in the recording device.

11. The apparatus according to claim 1, further comprising an input device that receives an amount of blur for an image represented by the display image signal, through an input operation, wherein the instructions further perform to determine the amount of blur based on the amount of image shift and the amount of blur received by the input device.

12. The apparatus according to claim 11, further comprising an input device that receives a selection whether to enable or disable a blurring process to be carried out on at least one of the plurality of parallax image signals.

13. The apparatus according to claim 1, wherein the instructions further perform to determine the amount of blur such that the amount of blur determined based on the amount of image shift is greater than the amount of blur shown by the subject image defocused by the amount of defocus within a range in which the amount of image shift is greater than a predetermined threshold value.

14. The apparatus according to claim 13, wherein the threshold value is zero.

15. The apparatus according to claim 13, wherein the threshold value is greater than zero.

16. The apparatus according to claim 15, wherein the instructions further perform to make the amount of blur constant in an area where the amount of image shift is greater than the threshold value.

17. An apparatus comprising:

an optical system;

a sensor that outputs a plurality of parallax image signals representing a plurality of parallax images, by converting an image of light entering the optical system into image signals; and at least one processor and a memory coupled to the at least one processor, the memory having instructions that, when executed by the at least processor, perform to:

obtain the plurality of parallax image signals output from the sensor;

calculate an amount of image shift between the plurality of parallax image signals;

determine an amount of blur in an area where an image shift occurs in the plurality of parallax image signals, based on the amount of image shift;

carry out a blurring process on at least one of the plurality of parallax image signals, based on the amount of blur;

generate a display image signal based on the at least one of the plurality of parallax image signals subjected to the blurring process; and display an image based on the display image signal on a display, wherein the based on the amount of image shift, to determine the amount of blur such that the amount of blur determined based on the amount of image shift is greater than an amount of blur shown by a subject image defocused by an amount of defocus converted from to the amount of image shift.

18. The apparatus according to claim 17, wherein the apparatus has an auto focus mode in which the optical system automatically focuses on a subject, and a manual focus mode in which the optical system is manually caused to focus on the subject, and wherein the based on the amount of image shift, to carry out the blurring process in a case where the apparatus is placed in the manual focus mode.

19. A method comprising:

obtaining a plurality of parallax image signals representing a plurality of parallax images;

calculating an amount of image shift between the obtained plurality of parallax image signals;

determining an amount of blur in an area in which an image shift occurs in the plurality of parallax image signals, based on the calculated amount of image shift;

carrying out a blurring process on at least one of the plurality of parallax image signals, based on the determined amount of blur;

generating a display image signal based on the at least one of the plurality of parallax image signals subjected to the blurring process, and displaying an image based on the display image signal on a display, wherein the amount of blur is determined such that the amount of blur determined based on the amount of image shift is greater than an amount of blur shown by a subject mage defocused by an amount of defocus converted from the amount of image shift.

* * * * *